Dec. 16, 1941.     E. E. KELLEMS     2,266,214
CONNECTOR
Filed April 25, 1939     2 Sheets-Sheet 1
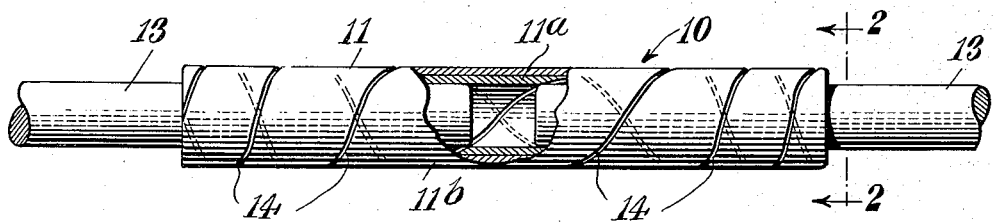
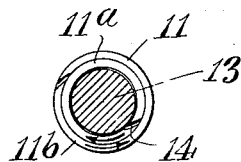
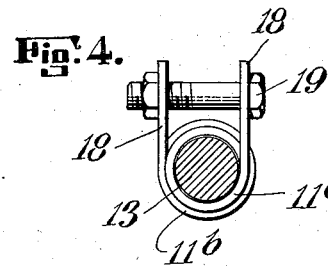
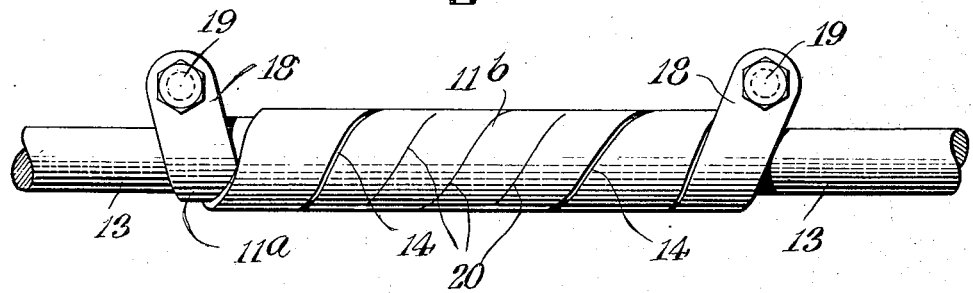
INVENTOR.
Edgar E. Kellems
BY George J. Schotler
ATTORNEY Dec. 16, 1941.  E. E. KELLEMS  2,266,214
CONNECTOR
Filed April 25, 1939  2 Sheets-Sheet 2

INVENTOR.
Edgar E. Kellems
BY George J. Schottler
ATTORNEY

Patented Dec. 16, 1941

2,266,214

UNITED STATES PATENT OFFICE 2,266,214

CONNECTOR

Edgar E. Kellems, Pasadena, Calif.

Application April 25, 1939, Serial No. 269,853

7 Claims. (Cl. 24—123)

This invention relates to gripping tubes of the type which is expanded or contracted by axial or rotational forces, commonly known as cable grips, and has for an object the provision of improvements in this art.

More particularly the invention has among its objects the provision of a gripping tube of maximum strength for its weight and size; which is smooth and free from sharp curves or projections whereby to avoid corona losses when the device is used for electrical conductors; which is flexible enough to avoid sharp bends when a wave of vibration travels along the conductor; which is so shaped that the section sizes at various points will generally be in proportion to the stresses imposed upon them, which may be cheaply manufactured as by cutting elements from a sheet metal strip; which is easy to install and remove; which has good gripping action initiated either by axial force or torque; and which in other respects is a general improvement in the art.

The objects and advantages of the invention will be apparent from the following description of an exemplary embodiment thereof, reference being made to the accompanying drawings, wherein:

Fig. 1 is a side elevation of a cable connected by a gripping tube made according to the present invention, parts being broken away at the center to show the interior construction;

Fig. 2 is a transverse section taken on the line 2—2 of Fig. 1;

Fig. 3 is a side elevation of a construction similar to that shown in Fig. 1 but modified by the addition of element connecting means;

Fig. 4 is an end view of Fig. 3;

Figure 5:
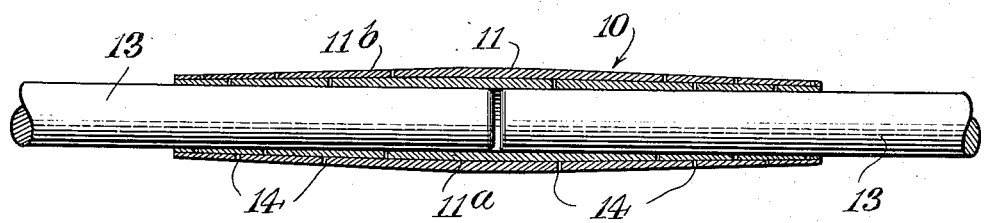
Fig. 5 is a side elevation of a modified construction in which the elements vary in thickness.

Gripping tubes of this broad general type are well known. For example, gripping tubes formed of braided wire are shown in my Patents Nos. 1,886,026 granted November 1, 1932, 1,945,195 granted January 30, 1934, and 1,966,929 granted July 17, 1934.

Wire strands have sharp bends due to circumference curvature and this tends to promote undesirable corona discharge. The wires must also be fairly thick to provide the necessary strength. The present invention provides a gripping tube which is formed of relatively thin smooth elements instead of wires.

For example, in Figs. 1 and 2 the gripping tube, generally designated by the numeral 10, is formed of flat elements 11. The element 11a is inside, where it will directly grip the ends of a rod or cable 13, and the element 11b is outside where it will reinforce and act upon the inner element. Each element forms a circumferential wrap or lay. In some instances the element may be formed as an elongated strip which is bent around a rod or mandrel and in other cases it may be formed by cutting a spiral slit in a tube. Normally where the tube is to be used to grip the exterior surface of a rod or cable it is made with an internal diameter which is smaller than the rod or cable and is somewhat resilient so that it will engage the rod or cable when applied. Where it is used to grip the interior surface of a member it is made oversize so as to initially expand into engagement.

The elements are proportioned according to the stresses to be taken. For example, since the central portion is required to take the cumulative stresses from the end portions, the central portion may be made wider or thicker than the end portions. Then the end portions being lighter and more resilient better serve the function required of them, which is to initiate the gripping action when stresses are applied. In Figs. 1 and 2 the required functions are served by making the central portions wider; in Fig. 5 they are served by making the central portions both wider and thicker.

As shown in Fig. 1, the slits 14 have a pitch angle of approximately 30 degrees at the center of the tube, the angle being measured from an axial line, and the slope gradually lessens until the pitch is approximately 75 degrees at the ends. Stated in terms of road grade or screw thread inclination, the pitch is 15 degrees at the ends and 60 degrees at the center.

For greater strength and to promote easy slippage the spiral slits of the inner and outer sleeves run in opposite directions. In fact, for a straight pull, they must run in opposite directions. This is indicated by the dotted lines at the right end of Fig. 1 and by the arrows in Fig. 2. In Fig. 1 the spiral path of the slits of the inner and outer elements are made the same but if desired they may be different in keeping with the functions imposed upon the respective elements. Also if desired, the spiral slits may run in the same direction instead of running in opposite directions, where there is a rotating, but not a longitudinal, stress on the cable.

Figure 7:
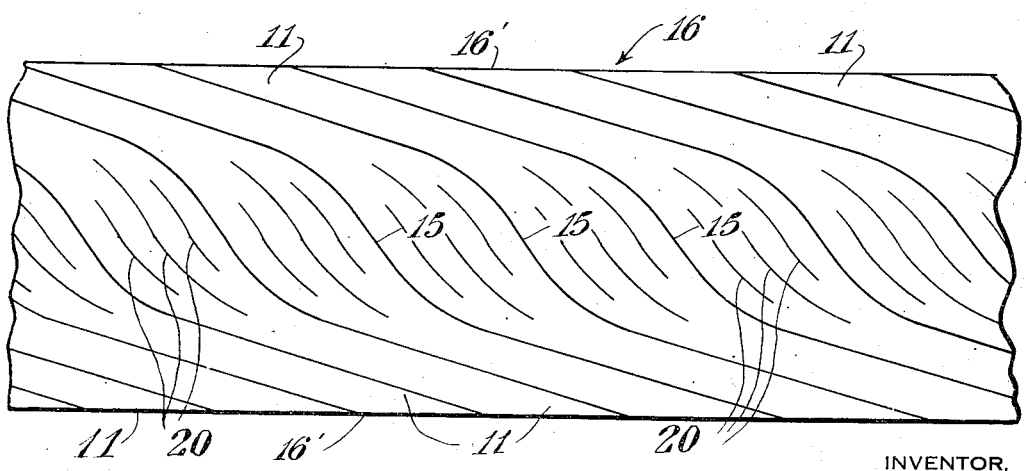
Fig. 7 is a plan view showing how the elements may be formed from a sheet metal strip.

A simple way of forming the elements 11 is shown in Fig. 7. As indicated in curved lines 15, they are cut one after another from a strip of metal 16. In this way all of the metal of a strip is utilized and none is wasted. It is to be noted that the lines 15 change direction at the ends of the elements 11 as at 16' to coincide with the parallel edges of the strip 16. When the elements are wound to form tubes these edges 16' will then form the ends of the tube.

The ends of the inner and outer elements may be connected in pairs. As shown in Figs. 3 and 4 this is accomplished by turning up the ends to form ears 18 and connecting them adjustably by bolts 19. When the ends are tightened upon a rod, cable or the like, this insures that the initial gripping action is started. In the form shown in Figure 1 the ends should be soldered, riveted or welded together to keep them in proper assembly and strengthen the action when only longitudinal or spring action instead of torque action initiates the gripping action, assuming oppositely wound elements.

I would consider it within the scope of my invention to form the interior diameter of the tubes smaller at the ends than further back to assist the gripping action, or in some cases, for example, when coupling a tapered rod or pin, to form the interior diameter at the end larger than the diameter further back.

Figure 6:
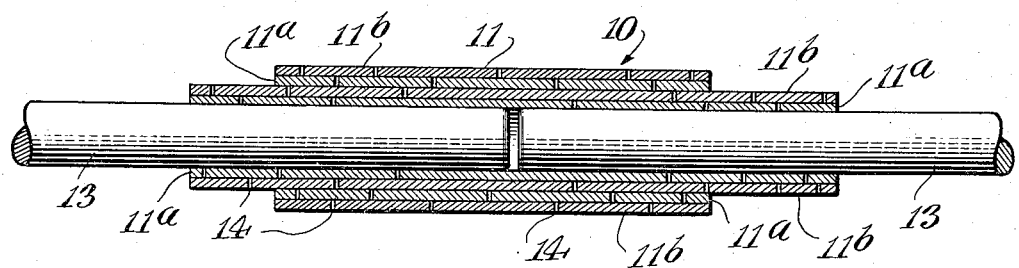
Fig. 6 is a side elevation of a modified construction in which the elements vary in length.

In Fig. 5 a construction is shown in which the center of the tubes is made thicker than the ends. This gives greater strength at the place where the cumulative stresses from the ends place the greatest strain. A similar result may be accomplished by the construction shown in Fig. 6 wherein pairs of oppositely wound elements are made progressively shorter toward the center. If desired, each element may be made up of laminae instead of a single thickness of material. Fig. 6 will serve to illustrate this.

It is not necessary for the operation of my invention that the tubes should be formed so as to grip at both ends as illustrated. One end may be used to grip a cable, and the other end, or half section, may be anchored in any desired manner. For example, a lag screw, machine screw, cable, eye bolt or any other siutable type of anchor may be used. In this case naturally only one rod or cable end could be gripped.

Instead of using a bolt to grip opposed ears together as shown in Fig. 3, I would consider it equivalent to initiate the gripping action by an axially moving nut arrangement, such as a nut threaded on the end of the connector to reduce its diameter at that point. The use of a nut in this manner eliminates the need for welding or soldering together the ends of the inner and outer elements. Likewise it is possible to use an axially moving nut to break the gripping action, by backing the nut up against the end of the connector. An advantage of using supplementary means to initiate the gripping action is that the gripping tube may be made sufficiently oversize to slip readily on a rod or cable or made sufficiently undersize to slip readily into a hole, thus avoiding the inherent gripping action while the tube is being installed.

It will be seen that the elements are shaped in such a way as to perform the required functions in the most efficient manner. Where the angle is small, as at the center where it is 30 degrees, the width of each wrap is great and the gripping action by wrapping is small while the strength is great, whereas where the angle is great, as at the ends where it is 75 degrees, the width of each wrap is small and the gripping action by wrapping is great while the strength is small. This follows the well-known law that the more turns about a drum by a rope or the like the greater will be the snubbing action. The snubbing or wrapping action results from the initial gripping action, the latter being due either to spring action or mechanical clamping of the end of the tube upon an object to be held. The entire action may be referred to as spiral gripping. Both the initial gripping action due to spring or clamping action and the snubbing or wrapping action, that is, the total spiral gripping, naturally depend upon the coefficient or friction between the surfaces involved. The present construction is well adapted to use all of these forces to the best advantage.

The angles mentioned are only suggestive and may vary within very wide limits.

There may be two or more sections in each layer, not only superimposed upon each other as shown at 11a and 11b in Fig. 6, but disposed side-by-side in the same plane. This has the advantage of providing a more concentric loading at all points. For example, two sections in the same layer or plane give loadings at 180° apart; three sections will give loadings at 120° apart and so on. For most purposes, non-concentric loading in a layer may not matter, but for some purposes it may be important.

Most forms of the connector are more flexible at the ends where the angles are greater and the sections are narrower than at the center where the angles are smaller and the sections are wider. However, if it is desired to make the connector more flexible at the center this may readily be accomplished by forming slits in the sections in general parallelism with the side edges as shown at 20 in Figs. 3 and 7. The slits will not weaken the section except in flexure as they are disposed parallel with the main lines of stress in the sections.

If it is desired to make the central portions stiffer or more rigid instead of more flexible, the central portions may be formed of unslitted or solid walled tubing, leaving only the end portions slotted for flexing and gripping.

The slits between the section edges stand open slightly before the connector is placed on a core or cable but are practically closed when the connector is gripped to a core of correct size. This gives a very smooth surface which reduces corona losses and, the slits being practically closed, makes the connector resistant to the entry of moisture and other undesirable penetrants.

The movement at any point on the connector is longitudinal and radial when the section angles are equal but in opposite directions. The connector will, therefore, grip any shape of core, whether round, oval, hexagonal, flat, etc. Stranded spiral cable can also be gripped by making the section angles of such an inclination as to provide circumferential movement approximately the same as the spiral movement of the stranded cable. The sections may be formed to fit the cable. This design can be worked out very well for stranded cables, messenger cables, guy wires, etc.

While certain embodiments of the invention have been described for purposes of illustration, it is to be understood that the invention may be variously modified within the limits of the prior art and the scope of the subjoined claims.

What I claim is:

1. A gripping tube comprising a helical wrap for overlying and gripping an object, a second helical wrap overlying and for gripping the first wrap, and means at the ends of the wraps securing the two wraps together to cause an initial gripping action.

2. A gripping tube comprising a helical wrap of flat material for overlying and gripping an object, a second helical wrap of flat material overlying and for gripping the first wrap, and means at the ends of the wraps securing the two wraps together to cause an initial gripping action.

3. A gripping tube comprising a helical wrap for overlying and gripping an object, a second helical wrap wound in the opposite direction from the first wrap overlying and for gripping the first wrap, and means at the ends of the wraps securing the two wraps together to cause an initial gripping action.

4. A gripping device comprising a helical wrap adapted to enclose the end of a member to be gripped and grip it, and a second helical wrap overlying and for gripping the first wrap, at least one of said helical wraps having a greater angle of wrap at one end than at a distance from said end to increase the strength of said wrap from the end inwardly.

5. A gripping device comprising a helical wrap adapted to enclose the end of a member to be gripped and grip it, and a second helical wrap overlying and for gripping the first wrap, at least one of said helical wraps having a greater angle of wrap at one end than at a distance from said end, the change in angle being gradual, to increase the strength of said wrap progressively from the end inwardly.

6. A gripping device comprising a helical wrap for overlying and gripping an object, and a second helical wrap overlying and for gripping the first wrap.

7. A gripping device comprising a helical wrap for overlying and gripping an object, a second helical wrap overlying and for gripping the first wrap, and means at one end of the wrap securing the two wraps together to cause an initial gripping action.

EDGAR E. KELLEMS.